United States Patent
Mayers

(10) Patent No.: US 7,293,689 B2
(45) Date of Patent: Nov. 13, 2007

(54) TWO TIER BRAZING FOR JOINING COPPER TUBES TO MANIFOLDS

(75) Inventor: Stephen L. Mayers, Jupiter, FL (US)

(73) Assignee: United Technologies Corporation, Hartford, CT (US)

( * ) Notice: Subject to any disclaimer, the term of this patent is extended or adjusted under 35 U.S.C. 154(b) by 224 days.

(21) Appl. No.: 10/818,839

(22) Filed: Apr. 6, 2004

(65) Prior Publication Data

US 2005/0218196 A1    Oct. 6, 2005

(51) Int. Cl.
*B23K 31/00* (2006.01)
*B23K 13/01* (2006.01)

(52) U.S. Cl. .............. 228/230; 228/254; 219/607; 219/615

(58) Field of Classification Search ......... 228/254; 219/615, 59.1
See application file for complete search history.

(56) References Cited

U.S. PATENT DOCUMENTS

| | | | | |
|---|---|---|---|---|
| 3,286,341 A * | 11/1966 | Miller | ............... | 228/175 |
| 3,534,986 A * | 10/1970 | Menne et al. | ............... | 285/55 |
| 3,875,027 A * | 4/1975 | Gondek | ............... | 205/129 |
| 4,193,180 A * | 3/1980 | Press | ............... | 29/890.03 |
| 4,379,216 A | 4/1983 | Weiss et al. | | |
| 4,620,662 A * | 11/1986 | Driggers | ............... | 228/227 |
| 4,683,361 A * | 7/1987 | Driggers | ............... | 219/644 |
| 4,700,040 A * | 10/1987 | Driggers | ............... | 219/85.1 |
| 4,700,053 A * | 10/1987 | Driggers et al. | ............... | 219/523 |
| 4,736,092 A * | 4/1988 | Pirl et al. | ............... | 219/523 |
| 5,152,449 A * | 10/1992 | Mizuhara | ............... | 228/124.1 |
| 5,253,616 A * | 10/1993 | Voss | ............... | 123/184.47 |
| 5,622,394 A * | 4/1997 | Soles et al. | ............... | 285/256 |
| 5,988,270 A * | 11/1999 | Chevallier | ............... | 165/178 |
| 6,400,800 B1 * | 6/2002 | Warren | ............... | 378/144 |
| 6,421,423 B1 * | 7/2002 | Warren | ............... | 378/144 |
| 2002/0085678 A1 * | 7/2002 | Warren | ............... | 378/144 |

FOREIGN PATENT DOCUMENTS

JP    52 030754 A    3/1977
JP    2001087853 A    4/2001

* cited by examiner

*Primary Examiner*—Kiley Stoner
(74) *Attorney, Agent, or Firm*—Marjama Muldoon Blasiak & Sullivan LLP

(57) ABSTRACT

A brazing process for joining copper and copper alloy tubes to a fitting which includes first forming a layer of a high melting temperature noble metal on one end of a copper or copper alloy tube. The plated end is then brazed to a metal ferrule to form a copper alloy-ferrule assembly. The assembly is then furnace brazed to a metal fitting.

14 Claims, 2 Drawing Sheets

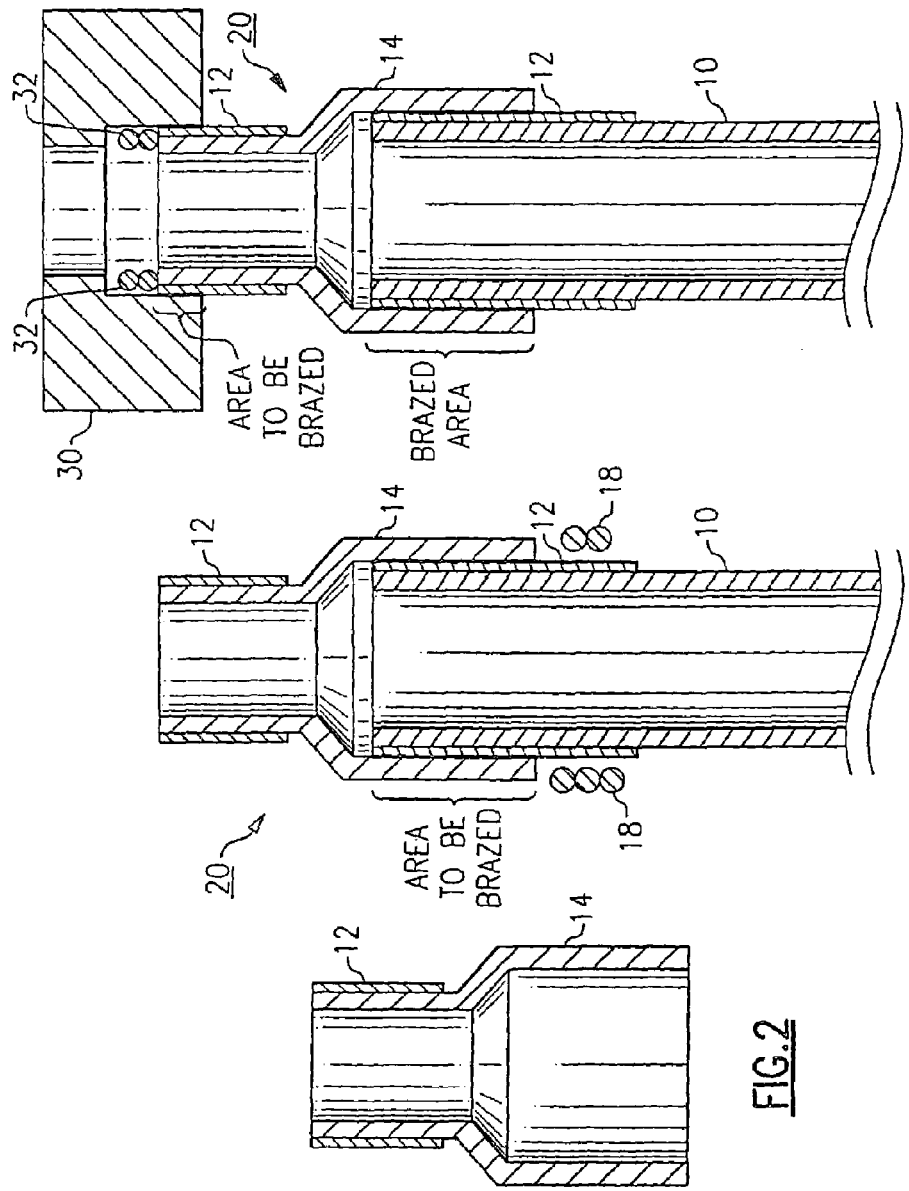

TWO TIER BRAZING FOR JOINING COPPER TUBES TO MANIFOLDS

FIELD OF THE INVENTION

The invention relates in general to joining copper or copper alloy tubes to metallic tubes such as manifolds, and more specifically to a two step brazing method for joining such tubes and manifolds.

BACKGROUND OF THE INVENTION

The conventional method of furnace brazing copper tubes directly to metal manifolds in a vacuum braze furnace has long presented problems with respect to alloying and erosion. Since vacuum braze furnaces do not allow for any significant observation of the braze joint during heating and additionally must cool a significant mass of tooling and equipment from the brazing temperature, the braze cycle cannot be terminated the moment the braze melts and fills the joint. Therefore to account for variables such as the measurement uncertainty of the thermocouples used measure the temperature of the part, and the variability of the amount of time and superheat required to fill the braze joints, the degree of alloying will always be expected to be higher than that involved in focused heating source methods.

These conditions very often lead to the interaction of copper alloy tubes with braze filler resulting in changes the microstructure of the copper, which generally reduces its strength, ductility and thermal conductivity.

The equation describing the rate at which a brazing filler metal can dissolve and remove a base metal is governed by the well-known ahrrenius-type equation:

Rate of Dissolution=$K_1 \cdot \exp[-Q/k_2 T]$

The equation above identifies the three variables influencing base metal dissolution and related phenomenon (alloying and erosion). Activation energy (represented by Q) is a function of the material combination present (brazing filler metal and base metal combination). $K_1$ and $k_2$ are constants determined by the materials present.

The second variable influencing the rate of dissolution of the copper alloy tubing by the brazing filler metal is temperature or superheat (represented by T). Superheat is controlled by the joining process heat source. As shown by the equation, the rate of base metal dissolution by a braze filler increase exponentially with the superheat. Therefore an ideal brazing process for joining copper tubes to metal manifolds is one which minimizes the superheat required to draw the brazing filler metal into the braze joint by capillary action.

In the case of induction or radiant heating methods, the braze filler can be observed directly as it melts and flows into the joint. This allows the braze cycle (and continued heating with attendant increases in superheat) to be terminated the moment a sound braze joint has been achieved. By contrast, furnace brazing as stated above, requires the tubes to be directly brazed to the manifolds in a vacuum braze furnace which does not allow for visual monitoring of the braze joint during heating, the braze cycle (and thus continued heating) cannot therefore be terminated the moment the braze metals and fills the joint. These conditions therefore usually result in a greater amount of superheat than that involved in focused heating source methods.

A third variable that is implied but not mentioned by the equation is time. For a given rate of dissolution, the extent of dissolution is impacted by the product of the rate and the time. Therefore an ideal brazing process for the application under consideration by the present invention is one which minimizes the time the braze filler is molten. Focused heating sources satisfy this rapid quenching of the braze joint from the brazing temperature simply by shutting off the heat source. The induction braze cycle typically lasts less than about two minutes. In contrast, the alternate furnace braze cycle lasts approximately 250 minutes. This over two orders of magnitude difference in the overall braze cycle reduces the amount of time the copper alloy tubes are exposed to molten braze filler and dramatically reduces the amount of superheat exposure.

SUMMARY OF THE INVENTION

It is therefore an object of the present invention to provide a brazing method which overcomes the problems of the conventional methods described above.

It is a further object of the present invention to provide an improved method for joining copper tubes to manifolds.

It is another object of the present invention to provide a two step brazing process which allows copper tubes to be efficiently joined to a metal manifold.

It is another object of the present invention to provide a copper tube ferrule assembly which facilitates joining copper tubes to metal tubes such as manifolds.

It is yet another object of the present invention to provide an improved method of brazing copper tube-ferrule assembly to a metal manifold.

The invention is directed to a method for metallurgically joining copper or copper alloy tubing to metallic manifolds for combustion chamber applications. This objective is accomplished through a three step process.

Copper or copper alloy tubes are coated or plated with a noble metal. The plated copper alloy tubing is then brazed to a metal ferrule to form a copper alloy tube-ferrule assembly. The copper alloy ferrule assembly is then brazed into a fitting or metallic tube such as a manifold. Depending on the chemistry of the brazing filler metal ferrule and manifold materials, brazing atmosphere quality, and brazing temperature, plating of the faying surfaces may or may not be required to facilitate wetting of the ferrule or manifold material by the braze filler selected.

The concept of using a two tiered brazing sequence to join the copper alloy tubes to metallic manifolds, with the first tier being a brazing process involving a focused heat source is an improvement over conventional techniques described above which are susceptible to the harmful effects of alloying and erosion.

BRIEF DESCRIPTION OF THE DRAWINGS

For a further understanding of these and objects of the invention, reference will be made to the following detailed description of the invention which is to be read in connection with the accompanying drawing, where:

FIG. 1 is a side sectional view of a copper or copper alloy tube having a layer of a noble metal on one end thereof.

FIG. 2 is a side sectional view of a ferrule having a layer of a noble metal on one end thereof.

FIG. 3 is a side sectional view of the ferrule of FIG. 2 in engagement with the end of the copper tube of FIG. 1 for brazing to form a copper tube-ferrule assembly.

FIG. 4 is a side sectional view of the brazed assembly of FIG. 3 in position for attachment by brazing to a metal manifold.

DETAILED DESCRIPTION OF THE INVENTION

Figure 5:
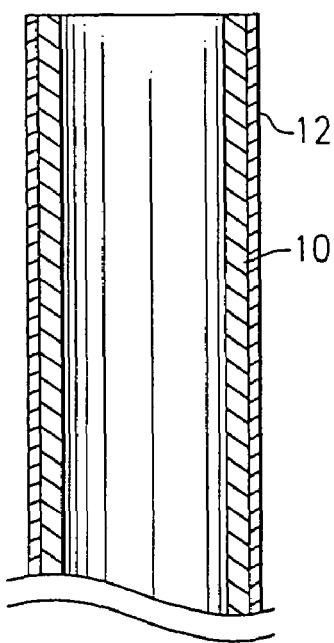
FIG. 5 is a side sectional view of a copper or copper alloy tube having a layer of a noble metal on its outer surface.
Figure 6:
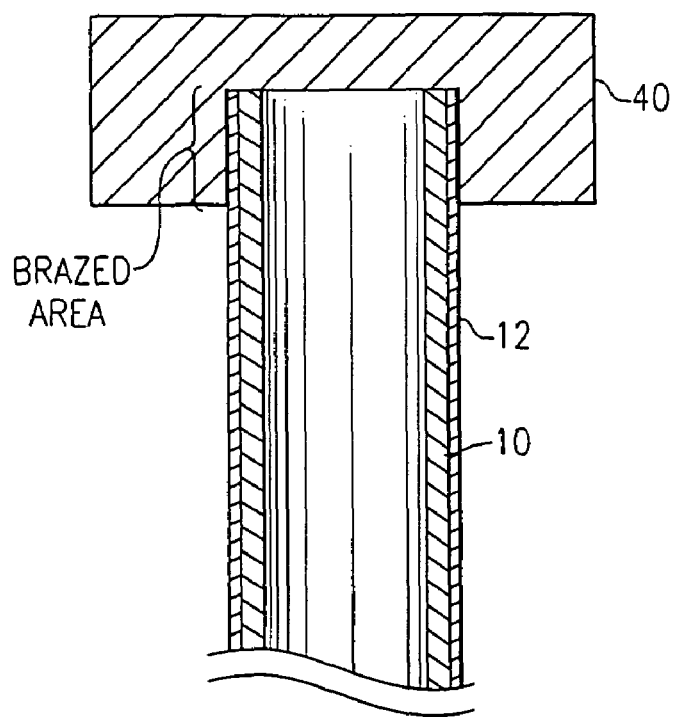
FIG. 6 is a side sectional view of the tube of FIG. 6 brazed to a metal manifold.

The process of the present invention provides significant improvement over the conventional technique described in FIGS. 5 and 6 of the drawings. Conventional methods involve providing a copper or copper alloy tube 10 and plating or coating the entire length of the tube with the noble metal 12. The coated or plated copper tube is then brazed directly to a manifold 40 as illustrated in FIG. 6. Typical problems associated with this technique occur where the plating over the entire surface of the copper tube is not uniform. When this occurs, a high risk of failure results due to imperfections in the plating or coating surface resulting in the brazing material alloying with the copper tube and deleteriously effecting the mechanical and physical properties of the copper tubes. Through the use of the present invention, the ferrule part of the copper tube-ferrule assembly can be brazed effectively to a compatible alloy or metal of the manifold, and therefore avoid the problems associated with coating the entire length of the copper tube with a noble metal.

FIGS. 1-4 illustrate one possible embodiment of the process of the present invention. In FIG. 1 a copper or copper alloy tube 10 is coated or plated with a high melting temperature metal 12 which is sufficiently noble to allow for the reduction or disassociation of its oxide in an inert atmosphere at temperatures required for brazing. Suitable materials include nickel, palladium, platinum, iridium, cobalt and osmium. Tube 10 may be substantially pure copper or a copper alloy. Suitable copper alloys which may be used typically contain aluminum in a concentration of about 0.2% by weight. In a preferred embodiment, the outer coating may comprise an electroplated layer of nickel approximately 10% of the wall thickness of the copper or copper alloy tube.

A metal ferrule or cap 14 as illustrated in FIG. 2 is provided, and in one embodiment has a layer of a noble metal 12 coated or plated over a portion of its upper surface. The metal ferrule must be suitable for brazing and attachment to a metal manifold and may be made from austenitic stainless steel, monel or a cobalt alloy having a thermal expansion which is compatible with the tube and manifold. The ferrule 14 is adapted for fitting contact and placement over the plated end of the copper tube as illustrated in FIG. 3 to form a copper tube-ferrule assembly 20. In a first tier of the process, brazing perform 18 is positioned as shown in FIG. 3 for forming a brazed joint between the ferrule and copper tube in the brazed contact area as illustrated by the brackets in FIG. 3. Suitable braze filler systems which may be used in the present invention include silver, copper, gold and nickel base systems.

Specific systems which may be used include the following:

| | |
|---|---|
| Cu—Ge—Ni | Au—Ag—Cu |
| Au—Cu—Ni | Ag |
| Au—Cu | Ag—Cu—Pd |
| Ag—Cu | |

A suitable system for the first tier brazing includes 80% Au-20% Cu.

The following brazing parameters have been found to be suitable for use in the present invention:

$1^{st}$ tier braze process: induction braze at 1670 to 1900 F. for 5 to 90 seconds using 200 kHz and single turn water cooled induction coil; brazing performed under positive pressure of argon with dew point of −35 F. or better.

The ferrule alloy must be selected to have a thermal expansion that is compatible with that of the copper or copper alloy being used for the tube. In the present invention the heating method used for first tier brazing must be selected to allow the thermal gradients within the part to be engineered to provide repeatable melting and flow of the brazed filler into the brazed joint or area. It has been found that a localized heat source is preferred to accomplish this objective. Suitable localized heat sources include induction coils and electromagnetic radiation sources. The copper tube and ferrule as shown in FIG. 3 are brazed with the heat source to form a copper alloy-ferrule assembly. In a second tier of the process, a plurality of assemblies are then brazed into a metallic manifold 30 as illustrated in FIG. 4 using brazed perform 32, preferably in an isothermal braze environment such as a vacuum furnace. For second tier brazing a 60% Ag, 30% Cu, 10% Pd system has been found to be suitable, with a furnace braze at 1585 to 1615 F. for 15 to 45 minutes; brazing performed under an inert gas (helium or argon). Depending upon the chemistry of the ferrule and the manifold materials, the brazing atmosphere quality, and brazing temperature, plating of the faying surfaces may or may not be required to facilitate wetting of the ferrule and manifold material by the braze filler selected.

The process of the present inventions allows for the effective joining of copper and copper alloy tubes to a manifold to obtain the advantages of the thermal conductivity of copper while effectively and efficiently joining the copper tubes to a high temperature alloy manifold through the copper alloy-ferrule assembly of the present invention. One possible use of such tube-ferrule-manifold assembly is in a combustion chamber of a rocket motor.

While the present invention has been particularly shown and described with reference to the preferred mode as illustrated in the drawing, it will be understood by one skilled in the art that various changes in detail may be effected therein without departing from the spirit and scope of the invention as defined by the claims.

I claim:

1. A two tier brazing process for joining a tube to a fitting to form a joint using a braze alloy which comprises:
   (a) forming a layer of a noble metal on at least one end of a copper or copper alloy tube;
   (b) brazing said end to a metal ferrule utilizing a focused heat source for a limited time of about 5 to 90 seconds to ensure rapid quenching of the joint after the molten braze alloy has filled the braze joint cavity, resulting in the formation of a copper alloy-ferrule assembly; and
   (c) furnace brazing said assembly to a metal fitting.

2. The process of claim 1 in which the metal ferrule contains a layer of a high melting temperature noble metal on at least a portion of its outer surface.

3. The process of claim 1 in which the noble metal layer is selected from the group consisting of nickel, palladium, platinum, iridium, cobalt and osmium.

4. The process of claim 1 in which the ferrule is made of a metal alloy selected from the group consisting of austenitic stainless steel, monel and alloys of cobalt.

5. The process of claim 1 in which the focused heat source is an induction coil.

6. The process of claim 1 in which the focused heat source uses electromagnetic radiation.

7. The process of claim 1 which includes a brazing filler system of at least one of the group consisting of silver, copper, gold, nickel and mixtures and alloys thereof.

8. The process of claim 1 in which the furnace brazing is carried out in a vacuum furnace.

9. The process of claim 1 in which the furnace brazing is carried out in a retort furnace.

10. A two tier brazing process which forms a joint using a braze alloy in joining copper alloy tubes to a manifold which comprises:
    (a) plating a layer of a high melting temperature noble metal on at least one end of a copper alloy tube;
    (b) brazing said plated end to a metal ferrule utilizing a focused heat source for a limited time of about 5 to 90 seconds to ensure rapid quenching of the joint after the molten braze alloy has filled the braze joint cavity, resulting in the formation of a copper alloy-ferrule assembly; and
    (c) furnace brazing said assembly into a metal manifold.

11. The process of claim 10 in which the metal ferrule contains a layer of a high temperature noble metal on at least a portion of its outer surface.

12. The process of claim 10 in which the plated layer comprises nickel.

13. A two tier brazing process which forms a joint using a braze alloy in joining copper and copper alloy tubes to manifolds which comprises:
    (a) forming a layer of nickel on at least one end of a copper or copper alloy tube;
    (b) brazing said plated end to a metal ferrule utilizing a focused heat source for a limited time of about 5 to 90 seconds to ensure rapid quenching of the joint after the molten braze alloy has filled the braze joint cavity, resulting in the formation of a copper alloy-ferrule assembly, and where said ferrule is made of a metal selected from the group consisting of austenitic stainless steel, monel and an alloy of cobalt; and
    (c) furnace brazing said assembly into a metal manifold.

14. The process of claim 13 in which the nickel layer is formed on said tube by electroplating.

* * * * *